United States Patent [19]

Menasce

[11] Patent Number: 5,193,166
[45] Date of Patent: Mar. 9, 1993

[54] CACHE-MEMORY ARCHITECTURE COMPRISING A SINGLE ADDRESS TAG FOR EACH CACHE MEMORY

[75] Inventor: Victor J. Menasce, Nepean, Canada

[73] Assignee: Bell-Northern Research Ltd., Ontario, Canada

[21] Appl. No.: 871,578

[22] Filed: Apr. 20, 1992

Related U.S. Application Data

[63] Continuation of Ser. No. 400,088, Aug. 29, 1989, abandoned.

[30] Foreign Application Priority Data

Apr. 21, 1989 [CA] Canada .................................. 597419

[51] Int. Cl.⁵ .................. G06F 12/02; G06F 9/34; G06F 13/00; G11C 8/00
[52] U.S. Cl. ..................................... 395/425; 395/400; 365/49; 365/230.01; 364/243; 364/243.4; 364/243.41; 364/400; 364/402; 364/DIG. 1
[58] Field of Search ................... 364/DIG. 1, DIG. 2; 395/425, 400, 250; 365/49, 230.01, 230.03

[56] References Cited

U.S. PATENT DOCUMENTS

| | | | |
|---|---|---|---|
| 3,761,883 | 9/1973 | Alvarez et al. | 364/200 |
| 4,392,200 | 7/1983 | Arulpragasam et al. | 364/200 |
| 4,467,414 | 8/1984 | Akagi et al. | 364/200 |
| 4,803,616 | 2/1989 | Uchiyama et al. | 364/200 |
| 4,899,275 | 2/1990 | Sachs et al. | 364/200 |
| 4,914,582 | 4/1990 | Bryg et al. | 364/200 |
| 4,930,106 | 5/1990 | Danilenko et al. | 365/189.01 |
| 4,933,835 | 6/1990 | Sachs et al. | 364/200 |
| 4,945,512 | 7/1990 | Dekarske et al. | 365/49 |
| 4,991,088 | 2/1991 | Kam | 364/200 |
| 5,025,366 | 6/1991 | Baror | 364/200 |

OTHER PUBLICATIONS

MC88200, Cache/Memory Management Unit (Motorola) User's Manual, pp. 1-2 to 1-4, and 1-6 and 1-7, Dec. 8, 1988.

"Problems, Directions and Issues in Memory Hierarchies" by Alan Jay Smith, published in the Proceedings of the Eighteenth Annual Hawaii International Conference on System Sciences, 1985, pp. 468-476.

"Line (Block) Size Choice for CPU Cache Memories" by Alan Jay Smith, published Sep. 9, 1987 in the IEEE Transactions on Computers, vol. C-36, No. 9.

Primary Examiner—Michael R. Fleming
Assistant Examiner—Gopal C. Ray
Attorney, Agent, or Firm—Lerner, David, Littenberg, Krumholz & Mentlik

[57] ABSTRACT

A cache-memory system comprising a processor bus for communicating between an associated processor (CPU) and associated cache-memory management units (CMMUs) communicating through the processor bus and each having a single cache address tag for addressing one associated cache; and each one of the plurality of CMMUs communicating through an associated one of a plurality of memory buses with a main memory of the system.

3 Claims, 2 Drawing Sheets

CACHE-MEMORY ARCHITECTURE COMPRISING A SINGLE ADDRESS TAG FOR EACH CACHE MEMORY

This is a continuation of application Ser. No. 07/400,088, filed Aug. 29, 1989, now abandoned.

BACKGROUND OF THE INVENTION

1. Field of the Invention

The present invention relates to digital computers in general, and to computer memory organization in particular. More particularly still, it relates to organization and architecture of cache-memory systems.

2. Prior Art of the Invention

The closest prior art known to the present invention is disclosed in detail in Motorola Inc.'s Users Manual of an integrated circuit known as the MC88200 cache/memory management unit or CMMU. This manual is incorporated herein by reference.

An excellent background paper on the general subject of the present invention by Alan Jay Smith is entitled "Problems, Directions and Issues in Memory Hierarchies" published in the Proceedings of the Eighteenth Annual Hawaii International Conference on System Sciences, 1985. Section 2 of this paper concerns cache memories and is particularly relevant.

Another important background paper by the above-mentioned author entitled "Line (Block) Size Choice for CPU Cache Memories" was published Sep. 9, 1987, in the IEEE Transactions On Computers, Vol. C-36, No. 9.

Cache memories temporarily hold portions of the contents of the main system memory which hopefully have a high probability of current use by the CPU or processor. In practice, the cache memory holds recently used contents of main memory. Thus the three basic performance parameters are "hit access time" "miss access time" and "hit ratio." Hit access time is the time to read or write cache memory, when the data is in the cache memory. Miss access time is the time to read main memory when the requested word is not in the cache memory. Hit ratio is the probability of finding the target data in the cache, and directly affects memory traffic making memory or bus bandwidth a critical and limiting resource in RISC (Reduced Instruction Set Computer) microprocessor systems (Smith, 1985).

Memory traffic consists of two components: fetch traffic and write or copyback traffic. The memory fetch traffic increases with line size in the cache, while generally the "miss ratio" (opposite of "hit ratio") declines with increasing line size. Memory traffic also increases with miss ratio.

SUMMARY OF THE INVENTION

A primary object of the present invention is to improve memory bandwidth and reduce its latency without degrading the hit or miss ratios.

The improved cache-memory architecture or system of the present invention is equally applicable to instructions or code caches and data caches, or to mixed caches.

Among disadvantages of the present invention are: an increase in the cache address "tag array" size; and an increase in the number of simultaneously switching signals on the system "backplane".

According to the present invention there is provided a cache-memory system comprising:

a processor bus for communicating between an associated processor (CPU) and an associated plurality of cache memory management units (CMMUs);

said CMMUs communicating through said processor bus and each having a single cache address tag array for addressing one associated cache array; and each one of said plurality of CMMUs communicating through an associated one of a plurality of memory buses with a main memory of said system.

Preferably, a cache will contain one data or code word per line of storage; but the system according to the invention will have a larger apparent or effective line size.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

Figure 1:
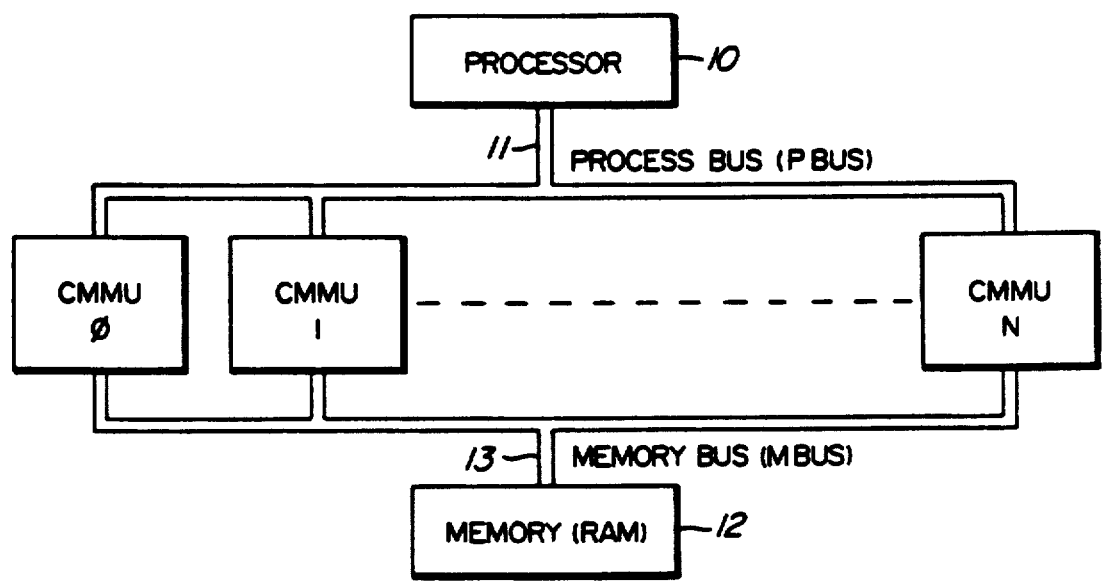
FIG. 1 is a block schematic of the prior art cache-memory architecture.

FIG. 1 of the drawings shows the system architecture of the prior art, where a processor 10 generally has a processor bus 11 for communicating with a plurality of CMMUs O to N. A CMMU, such as Motorola's MC88200, has a 16 k Bytes of high-speed instruction or data storage space. These 16 k Bytes of storage are organized in 1024 lines of 4 words/line, each word being 4 Bytes long. This is explained in full detail in the above-mentioned MC88200 Users Manual. The plurality of CMMUs, in turn, communicate with the main system memory 12, generally a RAM, via a memory bus 13. This organization is a 4 word/line cache and is also a 4-way set associative cache.

Figure 2:
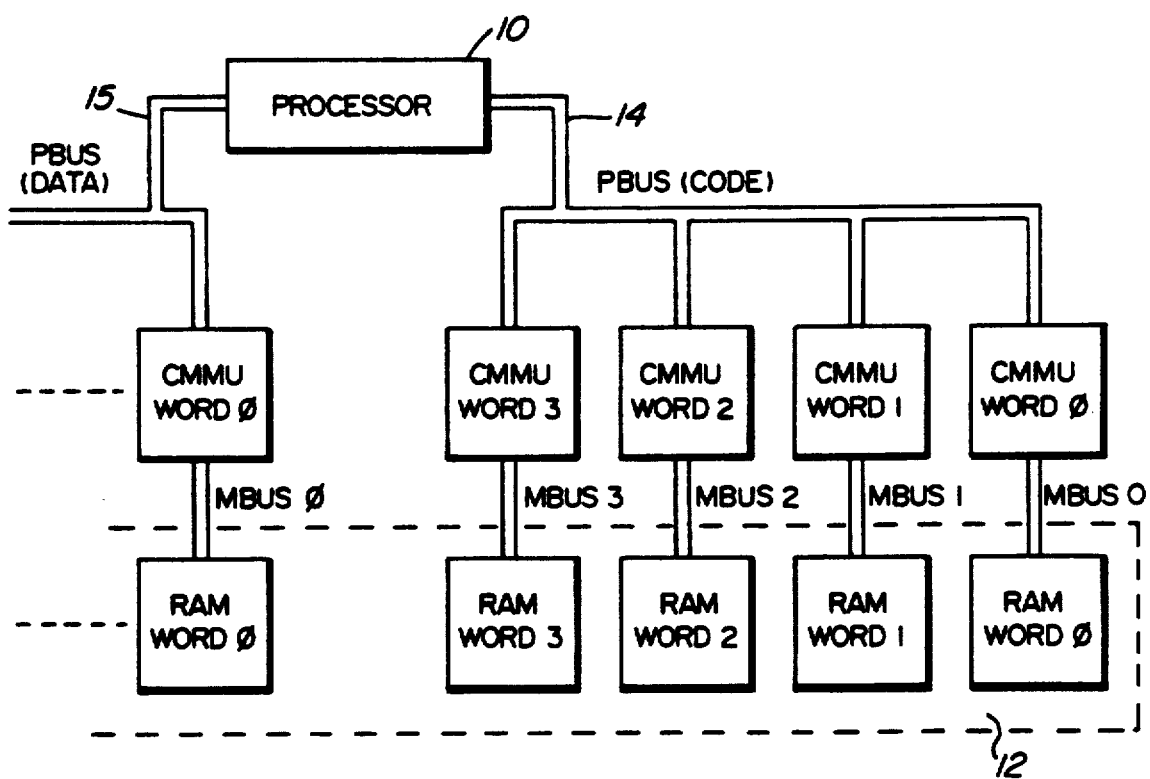
FIG. 2 is a block schematic of the cache-memory system of the present invention.

Turning now to FIG. 2 of the drawings, it shows an architecture according to the present invention, wherein the number of sets has been increased by a factor of x (here x=4) and, maintaining the size of cache memory, the number of word/line is reduced to 1. The apparent or effective number of words/line, however, remains at 4 words/line, thus maintaining the same hit or miss ratios.

In FIG. 2, the processor 10 has, as is often the case, two buses, a code bus 14 and a data bus 15. However, while the data and code words are interleaved on the PBUS, here they are, as a result of the cache reorganization, no longer interleaved on a memory bus.

Rather, each word, here 0 to 3, of the cache in each of the CMMUs is provided access to the corresponding word in the system RAM via a separate bus (MBUS0 to MBUS3), thus interleaving the CMMUs rather than the data or code words. This simple reorganization can result in an increase of memory bandwidth, and reduces average memory latency compared to sequential burst memory access. At the same time, due to the simplicity of the reorganization, the PBUS and MBUS specifications need not be altered. And should it be necessary to have still larger caches, the CMMUs for each word may be paralleled as taught by the prior art.

Figure 3:
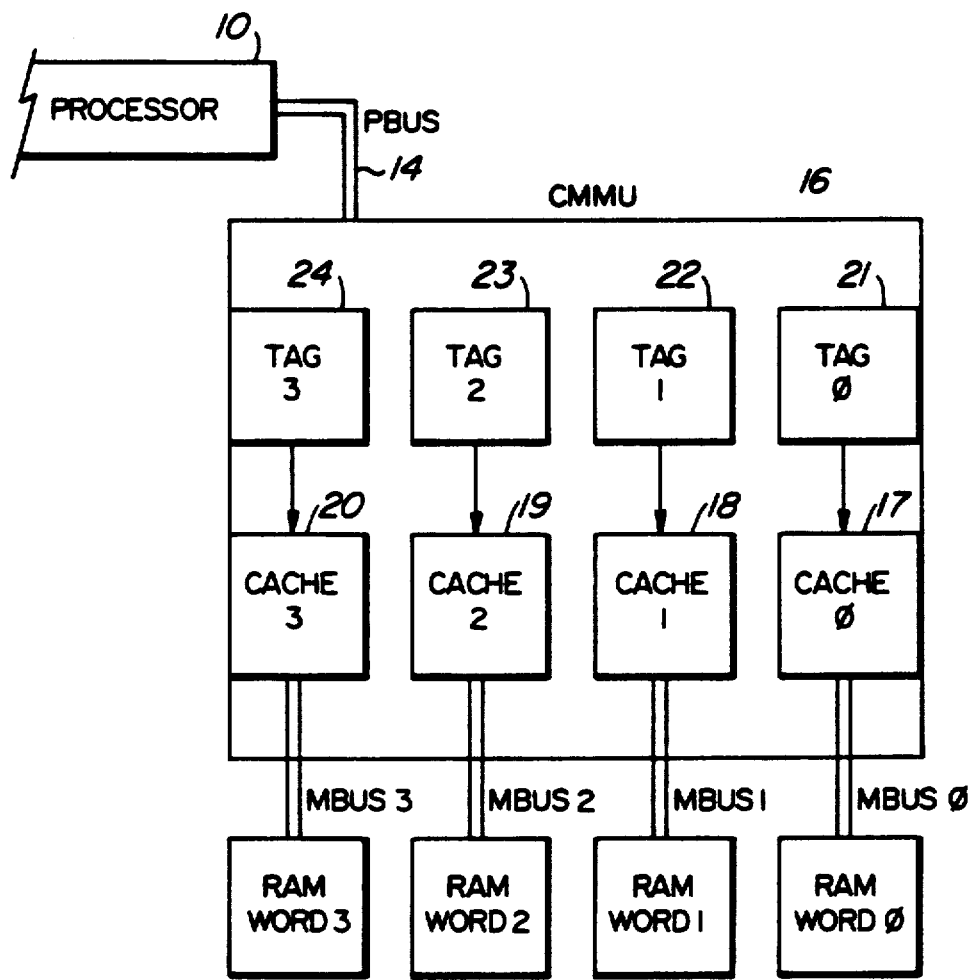
FIG. 3 is a block schematic of an alternative to FIG. 2.

The system architecture shown in FIGS. 2 and 3, however, requires an increase in the total cache address tag array size by a factor of appr. 4 for each CMMU, (actually the increase is from 256 entries to 1024 entries). Operationally, the standard cache algorithm is altered so that a miss on a line address results in a fetch instruction from the system memory 12 for all CMMUs, but that only the CMMU that matches on the word address returns the result to the processor 10.

Turning now to FIG. 3, it shows a unitary CMMU 16 having four cache memories 17 to 20, being addressed by means of four tags 21 to 24. This CMMU 16 is equivalent to four CMMUs shown in FIG. 2. Since the capability of address translation from logical or virtual memory addresses to physical cache addresses is determined by the much larger virtual addresses, this capability is essentially the same as that in the standard CMMU. Thus the CMMU 16 in FIG. 3 differs only in the manner and scale of integration, rather than any principle of operation. Practical pin-out problems may, however, have to be overcome.

I claim:
1. A cache-memory system comprising:
   a central processing unit (CPU);
   a plurality of cache-memory management units (CMMUs), each of said CMMUs having a single cache address tag for addressing one associated cache;
   a processor bus for providing communication between said CPU and said CMMUs;
   a plurality of main-memory storage units; and
   a plurality of buses for providing communication between said CMMUs and said main-memory storage units, each of said memory buses being associated with only one of said CMMUs and with only one of said main-memory storage units, such that each word stored in one of said CMMUs is associated with only one word stored in one of said main-memory storage units, thereby increasing memory bandwidth while decreasing average memory latency.

2. The cache-memory system of claim 1, wherein each one of said plurality of caches comprises only one word per line.

3. The cache memory system of claims 1 or 2, wherein each cache array has an effective number of words/line which is larger than its actual number of words/line stored.

* * * * *

UNITED STATES PATENT AND TRADEMARK OFFICE
CERTIFICATE OF CORRECTION

PATENT NO. : 5,193,166
DATED : March 9, 1993
INVENTOR(S) : Menasce

It is certified that error appears in the above-identified patent and that said Letters Patent is hereby corrected as shown below:

On the title page, item (54) in the title, line 2, after "TAG" insert --ARRAY--;

in the Abstract [57], line 5, after "tag" insert --array--; and line 6, after "cache" insert --array--.

Column 2, line 45, "word/line" should read --words/line--.

Column 3, line 16, "than any" should read --than in any--.

Signed and Sealed this

Twenty-first Day of December, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.   : 5,193,166
DATED        : March 9, 1993
INVENTOR(S)  : Menasce

It is certified that error appears in the above-indentified patent and that said Letters Patent is hereby corrected as shown below:

On the title page item [73], "Bell-Northern Research Ltd., Ontario, Canada" should read --Northern Telecom Limited, Quebec, Canada--.

Signed and Sealed this

Twenty-eighth Day of May, 1996

Attest:

BRUCE LEHMAN

Attesting Officer           Commissioner of Patents and Trademarks